(12) United States Patent
Shenny et al.

(10) Patent No.: US 10,563,584 B2
(45) Date of Patent: Feb. 18, 2020

(54) FLOAT WALL COMBUSTOR PANELS HAVING AIRFLOW DISTRIBUTION FEATURES

(71) Applicant: United Technologies Corporation, Farmington, CT (US)

(72) Inventors: Jason Shenny, West Hartford, CT (US); John J. Rup, Jr., Willington, CT (US); Robert M. Sonntag, Bolton, CT (US); James B. Hoke, Tolland, CT (US); San Quach, Southington, CT (US); Richard G. Ullrich, Brookline, NH (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 299 days.

(21) Appl. No.: 15/795,301

(22) Filed: Oct. 27, 2017

(65) Prior Publication Data

US 2019/0128187 A1 May 2, 2019

(51) Int. Cl.
*F23R 3/00* (2006.01)
*F02C 7/18* (2006.01)
*F23R 3/04* (2006.01)

(52) U.S. Cl.
CPC ............. *F02C 7/18* (2013.01); *F23R 3/002* (2013.01); *F23R 3/04* (2013.01); *F05D 2220/32* (2013.01);
(Continued)

(58) Field of Classification Search
CPC ..... F23R 2900/03045; F05D 2240/127; F05D 2260/2212
See application file for complete search history.

(56) References Cited

U.S. PATENT DOCUMENTS

| | | | |
|---|---|---|---|
| 5,220,795 A | 6/1993 | Dodds et al. | |
| 5,601,399 A | 2/1997 | Okpara et al. | |

(Continued)

FOREIGN PATENT DOCUMENTS

| | | |
|---|---|---|
| CA | 2602622 A1 | 5/2008 |
| EP | 1905951 A1 | 4/2008 |

OTHER PUBLICATIONS

European Search Report for European Application No. 18202988.4, International Filing Date Oct. 26, 2018, dated Mar. 1, 2019, 11 pages.

*Primary Examiner* — Lorne E Meade
*Assistant Examiner* — Alyson Joan Harrington
(74) *Attorney, Agent, or Firm* — Cantor Colburn LLP

(57) ABSTRACT

Combustor panels including panel bodies with first and second sides, a pin array extending from the first side, wherein each pin extends a first height, has a pin diameter, and is separated from adjacent pins by a pin array separation distance. A structural protrusion extends from the first side. No pins of the pin array are located within a flashing distance that is equal to a protrusion separation distance plus half of the pin diameter, wherein a location of the pin is measured from a center point of the pin to a closest point on the exterior surface of the structural protrusion. At least one pin array extension is integrally formed with the structural protrusion, the pin array extension extending along the first side to a position that replaces a pin of the pin array that would be within the flashing distance.

13 Claims, 7 Drawing Sheets

(52) U.S. Cl.
CPC .. *F05D 2240/35* (2013.01); *F05D 2260/2214* (2013.01); *F23R 2900/03045* (2013.01)

(56) References Cited

U.S. PATENT DOCUMENTS

| | | |
|---|---|---|
| 7,681,398 B2 | 3/2010 | Patel et al. |
| 9,322,560 B2 | 4/2016 | Erbas-Sen et al. |
| 2014/0090402 A1* | 4/2014 | Erbas-Sen .................. F23R 3/04 60/806 |
| 2019/0049115 A1 | 2/2019 | Shenny et al. |

\* cited by examiner

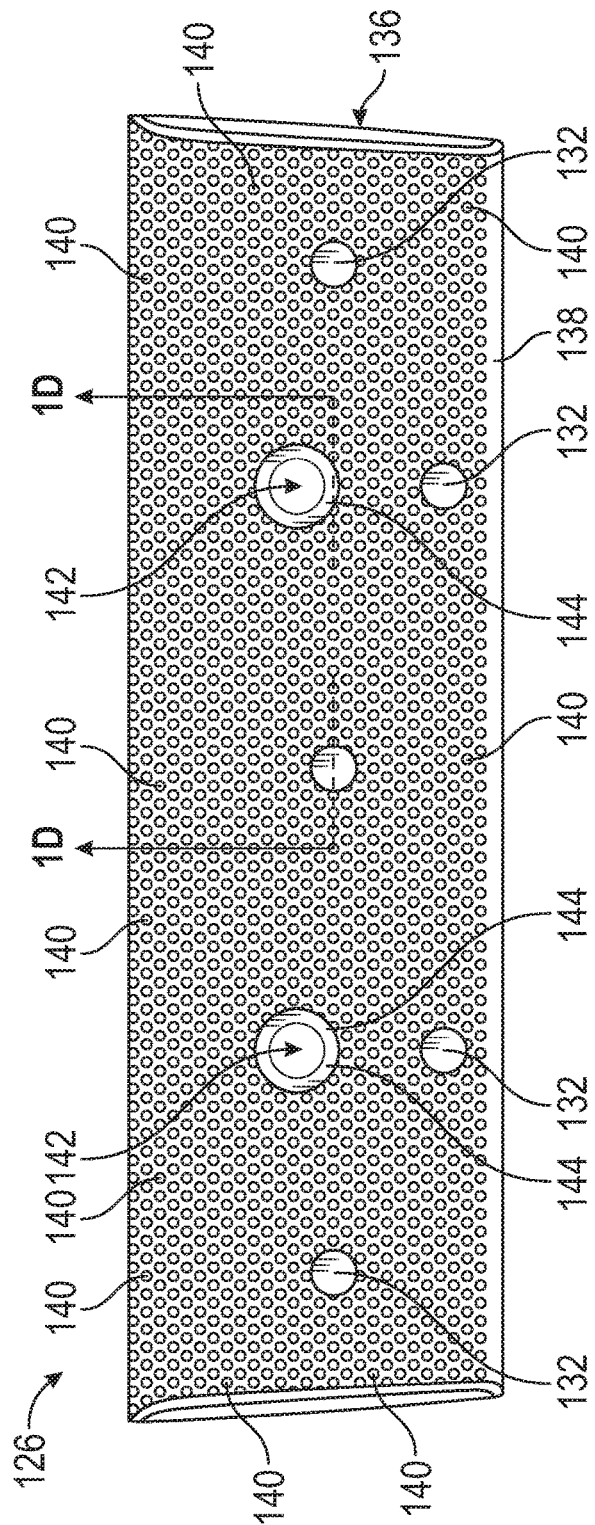
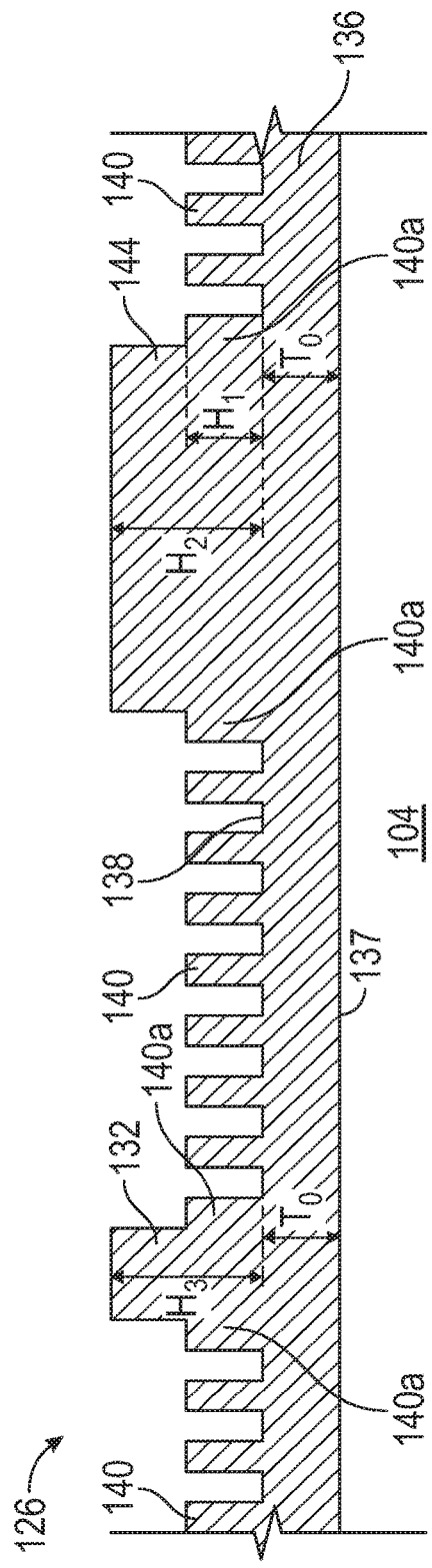
FIG. 1C
FIG. 1D

FLOAT WALL COMBUSTOR PANELS HAVING AIRFLOW DISTRIBUTION FEATURES

BACKGROUND

The subject matter disclosed herein generally relates to float wall combustor panels for gas turbine engines and, more particularly, air flow distribution features of float wall combustor panels and molds for making the same.

A combustor of a gas turbine engine may be configured and required to burn fuel in a minimum volume (e.g., a combustion chamber). Such configurations may place substantial heat load on the structure of the combustor. The heat loads may dictate that special consideration is given to structures which may be configured as heat shields or panels configured to protect the walls of the combustor, with the heat shields being air cooled.

The combustor of a gas turbine engine mixes and ignites compressed air with fuel, generating hot combustion gases. These hot combustion gases are then directed by the combustor to the turbine section of the engine where power is extracted from the hot gases. The walls of a combustor are lined with the heat shields or panels (e.g., float wall panels) that protect the body of the combustor liner from damage due to exposure with the hot gases.

Each float wall panel has several structural protrusions to offset the float wall panel from the combustor wall, providing a channel of airflow for cooling. The cooling pins also provide increased surface area for heat transfer from the float wall panel to the cooling airflow channel. During engine service operation, the combustor has to withstand extremely high temperatures, oxidizing, corrosive and erosive conditions. Thus, improved cooling flow arrangements for float wall panels may be desirable.

SUMMARY

According to some embodiments, combustor panels for use in gas turbine engines are provided. The combustor panels include a panel body having a first side and a second side, a plurality of cooling pins extending from the first side, the plurality of cooling pins arranged in a pin array, wherein each cooling pin extends a first height from the first side of the panel body, has a pin diameter, and is separated from adjacent cooling pins of the pin array by a pin array separation distance, at least one structural protrusion extending from the first side of the panel body, wherein no cooling pins of the pin array are located at a position within a flashing distance that is equal to a protrusion separation distance plus one half of the pin diameter, wherein the protrusion separation distance is a predetermined minimum distance between an exterior surface of the at least one structural protrusion and an exterior surface of a cooling pin, and wherein a location of the cooling pin is measured from a center point of the cooling pin to a closest point on the exterior surface of the at least one structural protrusion, and at least one pin array extension integrally formed with the at least one structural protrusion, the at least one pin array extension extending along the first side to a position that replaces a cooling pin of the pin array that would be within the flashing distance.

In addition to one or more of the features described above, or as an alternative, further embodiments of the combustor panels may include that the at least one structural protrusion extends from the first side a distance greater than the first height;

In addition to one or more of the features described above, or as an alternative, further embodiments of the combustor panels may include that the at least one structural protrusion is at least one of a dilution hole boss and an attachment mechanism.

In addition to one or more of the features described above, or as an alternative, further embodiments of the combustor panels may include that the at least one structural protrusion includes a plurality of pin array extensions arranged around the at least one structural protrusion.

In addition to one or more of the features described above, or as an alternative, further embodiments of the combustor panels may include that the pin array separation distance is between 0.010 inches and 0.015 inches.

In addition to one or more of the features described above, or as an alternative, further embodiments of the combustor panels may include that the pin array separation distance is 0.013 inches.

According to some embodiments, combustors for gas turbine engines are provided. The combustors include a combustor shell and at least one combustor panel mounted to the combustor shell. The at least one combustor panel includes a panel body having a first side and a second side, a plurality of cooling pins extending from the first side, the plurality of cooling pins arranged in a pin array, wherein each cooling pin extends a first height from the first side of the panel body, has a pin diameter, and is separated from adjacent cooling pins of the pin array by a pin array separation distance, at least one structural protrusion extending from the first side of the panel body, wherein no cooling pins of the pin array are located at a position within a flashing distance that is equal to a protrusion separation distance plus one half of the pin diameter, wherein the protrusion separation distance is a predetermined minimum distance between an exterior surface of the at least one structural protrusion and an exterior surface of a cooling pin, and wherein a location of the cooling pin is measured from a center point of the cooling pin to a closest point on the exterior surface of the at least one structural protrusion, and at least one pin array extension integrally formed with the at least one structural protrusion, the at least one pin array extension extending along the first side to a position that replaces a cooling pin of the pin array that would be within the flashing distance.

In addition to one or more of the features described above, or as an alternative, further embodiments of the combustors may include that the at least one structural protrusion extends from the first side a distance greater than the first height;

In addition to one or more of the features described above, or as an alternative, further embodiments of the combustors may include that the at least one structural protrusion is a dilution hole boss arranged to allow dilution air to pass through the combustor shell and the combustor panel into a combustion chamber.

In addition to one or more of the features described above, or as an alternative, further embodiments of the combustors may include that the at least one structural protrusion is an attachment mechanism, wherein the attachment mechanism fixedly attaches the at least one combustor panel to the combustor shell.

In addition to one or more of the features described above, or as an alternative, further embodiments of the combustors may include that the at least one structural protrusion includes a plurality of pin array extensions arranged around the at least one structural protrusion.

In addition to one or more of the features described above, or as an alternative, further embodiments of the combustors may include that the pin array separation distance is between 0.010 inches and 0.015 inches.

In addition to one or more of the features described above, or as an alternative, further embodiments of the combustors may include that the pin array separation distance is 0.013 inches.

In addition to one or more of the features described above, or as an alternative, further embodiments of the combustors may include that the at least one combustor panel is positioned with the second side exposed to a combustion chamber and a cooling flow passes between the combustor shell and the at least one combustor panel along the first side, wherein the pin array provides thermal transfer between the at least one combustor panel and the cooling flow.

In addition to one or more of the features described above, or as an alternative, further embodiments of the combustors may include that the at least one pin array extension alters the cooling flow around the at least one structural protrusion to prevent hot zones on the at least one combustor panel at locations downstream of the at least one structural protrusion in a direction of flow of the cooling flow.

In addition to one or more of the features described above, or as an alternative, further embodiments of the combustors may include that the at least one combustor panel is a float wall combustor panel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 1C is a schematic illustration of a float wall panel of the combustor of the combustor section shown in FIG. 1B that may employ various embodiments disclosed herein;

FIG. 1D is a cross-sectional illustration of the float wall panel of FIG. 1C as viewed along the line D-D;

DETAILED DESCRIPTION

Figure 1A:
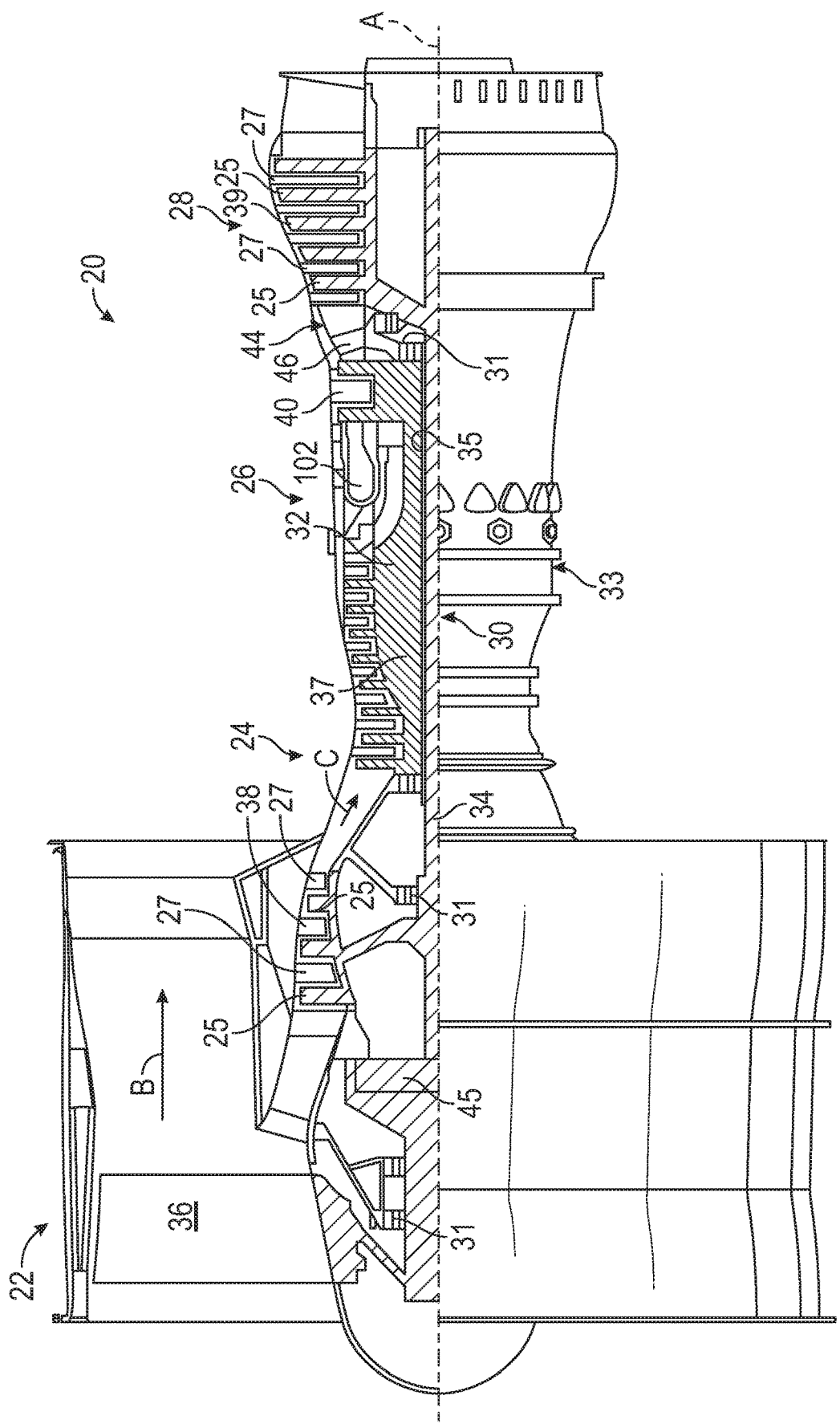
FIG. 1A is a schematic cross-sectional illustration of a gas turbine engine that may employ various embodiments disclosed herein.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 102 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 102, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be the pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ ^\circ R)/(518.7^\circ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 1B:
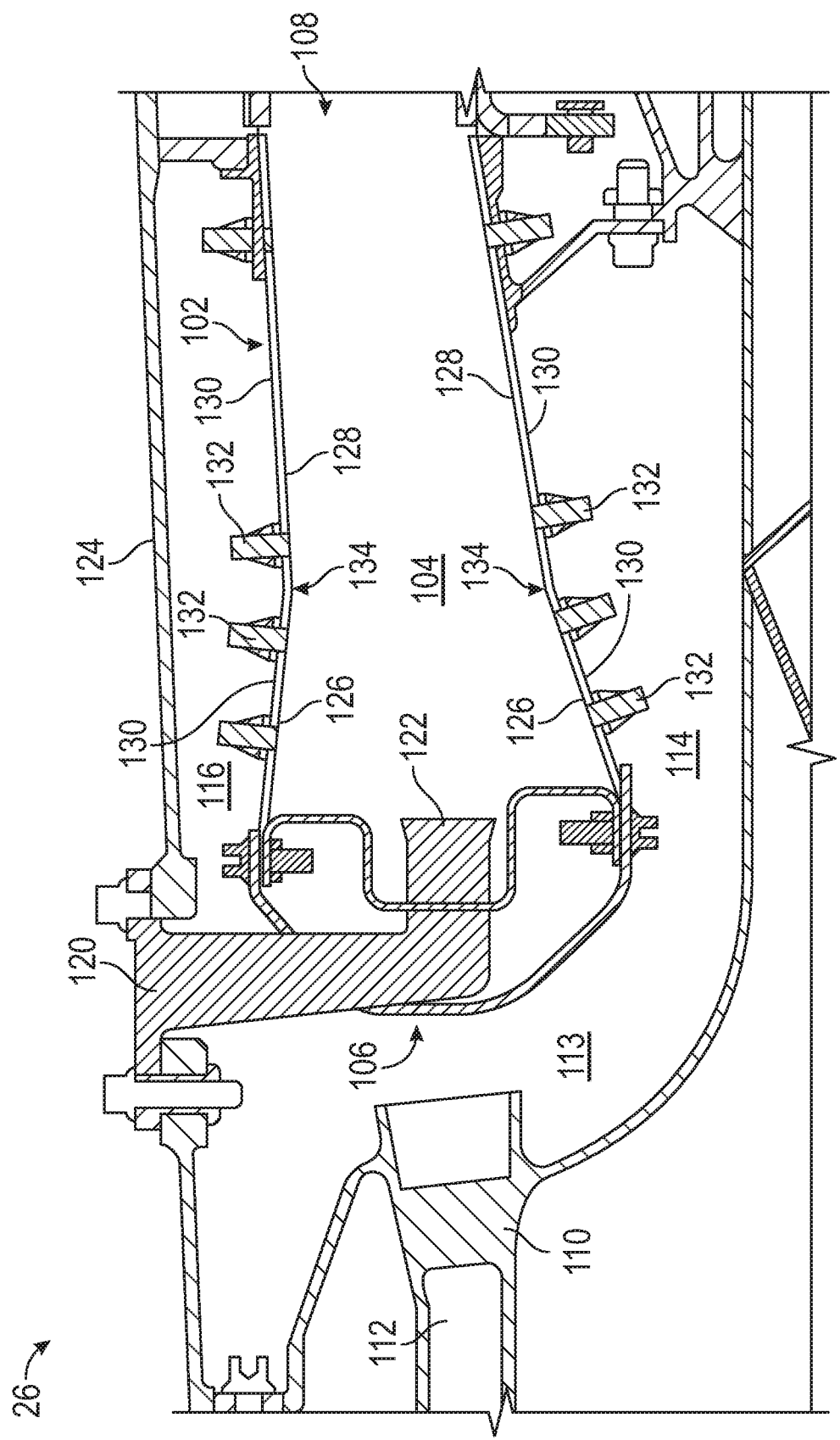
FIG. 1B is a schematic illustration of a combustor section of the gas turbine engine of FIG. 1A that may employ various embodiments disclosed herein.

FIG. 1B is an enlarged schematic illustration of the combustion section 26 of the engine 20 that can employ embodiments of the present disclosure. As shown, the engine 20 includes a combustor 102 defining a combustion chamber 104. The combustor 102 includes an inlet 106 and an outlet 108 through which air may pass. The air is supplied to the combustor 102 by a pre-diffuser 110.

In the configuration shown in FIG. 1B, air may be supplied from a compressor into an exit guide vane 112, as will be appreciated by those of skill in the art. The exit guide vane 112 is configured to direct the airflow into the pre-diffuser 110, which then directs the airflow toward the combustor 102. The combustor 102 and the pre-diffuser 110 are separated by a shroud plenum, cavity, or chamber 113 that contains the combustor 102. The shroud chamber 113 includes an inner diameter branch 114 and an outer diameter branch 116. As air enters the shroud chamber 113, a portion of the air will flow into the combustor inlet 106, a portion will flow into the inner diameter branch 114, and a portion will flow into the outer diameter branch 116. The air from the inner diameter branch 114 and the outer diameter branch 116 will then enter the combustion chamber 104 by means of one or more nozzles, holes, apertures, etc. that are formed on the external surfaces of the combustor 102. The air will then exit the combustion chamber 104 through the combustor outlet 108. At the same time, fuel is supplied into the combustion chamber 104 from a fuel injector 120 and a nozzle 122. The fuel is ignited within the combustion chamber 104. The combustor 102 of the engine 20, as shown, is housed within a shroud case 124 which defines, in part, the shroud chamber 113.

The combustor 102, as will be appreciated by those of skill in the art, includes one or more combustor panels 126, 128 that are mounted on an interior surface of one or more combustor shells 130 and are configured parallel to the combustor shell 130 (whether at the inner or outer diameter). The combustor panels 126, 128 can be removably mounted to the combustor shell 130 by one or more attachment mechanisms 132. In some embodiments, the attachment mechanisms 132 can be integrally formed with a respective combustor panel 126, 128 and/or the combustor shell 130, although other configurations are possible. In some embodiments, the attachment mechanisms 132 are bolts or other structures that extend from the respective combustor panel 126, 128 through the interior surface thereof to a receiving portion or aperture of the combustor shell 130 such that the panel 126, 128 can be attached to the combustor shell 130 and held in place.

The combustor panels 126, 128 may include a plurality of cooling holes and/or apertures (e.g., dilution holes) to enable fluid, such as gases, to flow from areas external to the combustion chamber 104 into the combustion chamber 104. Cooling may be provided from the shell-side of the panels 126, 128 and hot gases may be in contact with the combustion-side of the panels 126, 128 during combustion within the combustion chamber 104. That is, hot gases may be in contact with a surface of the panels 126, 128 that is facing the combustion chamber 104. The combustor panels 126, 128 may be float wall panels, as will be appreciated by those of skill in the art.

First panels 126, as shown in FIG. 1B, are configured about the inlet 106 of the combustor 102 and may be referred to as forward panels. Second panels 128 may be positioned axially rearward and adjacent the first panels 126 and may be referred to as aft panels. The first panels 126 and the second panels 128 are configured with a gap 134 formed between axially adjacent first panels 126 and second panels 128. The gap 134 may be a circumferentially extending gap that extends about a circumference of the combustor 102. A plurality of first panels 126 and second panels 128 may be attached and extend about an inner diameter of the combustor 102, and a separate plurality of first and second panels 126, 128 may be attached and extend about an outer diameter of the combustor 102, as known in the art.

Combustor panels, such as shown in FIG. 1B, may require an even distribution of cooling pins located on a cold side of the combustor panels 126, 128. The panels 126, 128 further require various other features, including, but not limited to bosses and attachment mechanisms, as described herein. The even distribution of cooling pins allows for even cooling of the combustor panels. As appreciated by those of skill in the art, the panels are typically curved to form an annular structure combustion chamber. Because of the curve of the panels, and the nature of the manufacturing process, forming both "normal" extending cooling pins and other extending features, such as bosses and attachment mechanisms, various issues may arise, whether related to producibility and/or operability and efficiency in use.

Turning now to FIG. 1C, an enlarged illustration of a combustor panel 126 is shown, viewing an under side or cold side of the combustor panel 126. The combustor panel 126 includes a panel body 136 having a hot side 137 (facing the combustion chamber 104, and shown in FIG. 1D) and a cold side 138, shown in FIG. 1C. As used herein, the "cold side" of a combustor panel may be referred to as a first side and the "hot side" of the combustor panel may be referred to as a second side. As noted, the hot side of the panel faces a combustion chamber and is thus subject to high temperatures associated with combustion reactions. The cold side is the opposite side of the panel from the hot side and is arranged and/or formed to provide cooling and/or heat transfer or removal from the hot side (e.g., to reduce or regulate an operating temperature of the combustor panel).

The cold side 138 of the panel body 136 includes a plurality of cooling pins 140 extending outwardly therefrom (e.g., toward shroud chamber 113 when installed within the combustion section 26). In one non-limiting example, the panel body 136 of the combustor panel 126 can be made of cast nickel based super-alloys while the cooling pins 140 can be made of cast or wrought nickel based alloys. In other embodiments, the panel body 136 and the cooling pins 140 are formed in a single casting and formed from the same material. In a non-limiting example, the cooling pins 140 may be formed with a diameter between 0.020 inches and 0.060 inches and have a length of extension from the cold side 138 between 0.020 inches and 0.200 inches.

The panel body 136 also includes a plurality of attachment mechanism 132 that extend outwardly from the cold side 138 of the panel body 136 for attachment of the combustor panel 126 to the combustor shell 130, as shown in FIG. 1B. Further, the panel body 136 includes dilution holes 142 that pass through the panel body 136 from the cold side 138 to the hot side 137. The dilution holes 142 enable air from the shroud chamber 113 to flow into the combustion chamber 104 to aid in the combustion of fuel that is injected into the combustion chamber 104 from the nozzle 122 or other fuel injector. The dilution holes 142 are each defined, in part, by a dilution hole boss 144. The dilution hole boss 144 provides structural support to the panel body 136 at the location of the dilution holes 142.

FIG. 1D is a cross-sectional view of the combustor panel 126 showing the hot side 137 and cold side 138 and variable heights of features of the cold side 138. As shown in FIGS. 1C-1D, the combustor panel 126 has an even distribution of cooling pins 140 located on the cold side 138 of the panel body 136. Stated another way, the cooling pins 140 extend from a first side of the combustor panel and are arranged to provide thermal transfer from the second (hot) side of the combustor panel. The cooling pins 140 are arranged in a pattern or array to enable consistent and/or uniform cooling to the combustor panel.

Also extending from the cold side 138 of the panel body 136 are the dilution hole bosses 144 and the attachment mechanisms 132 (referred to herein generically as "structural protrusions," which may encompass other structures extending from the cold side of a combustor panel). As shown in FIG. 1D, the panel body 136 has a first thickness $T_0$ which is selected to minimize weight, provide shielding and containment for combustion processes, etc. as will be appreciated by those of skill in the art. The cooling pins 140 extend from the cold side 138 by a first height $H_1$. The first height $H_1$ is selected to optimize cooling that is provided to the panel body 136 while minimizing weight. Further, the distribution of the cooling pins 140 is arranged for optimized cooling (e.g., separation distance between adjacent cooling pins). The dilution hole bosses 144 and the attachment mechanisms 132 extend from the cold side 138 of the panel body 126 a second height $H_2$, and a third height $H_3$, respectively, with the second height $H_2$ and the third height $H_3$ being greater than the first height $H_1$. The increased thickness provided by the extension of the dilution hole bosses 144 and the attachment mechanisms 132 to the second height $H_2$ and the third height $H_3$ enables increased support and/or structure to the panel body 126 and/or enables engagement with the combustor shell 130 (shown in FIG. 1B).

During a casting process used to manufacture the combustor panel 126, producibility issues may arise with respect to the formation of the cooling pins 140 that are close to or in near proximity to features that extend from the cold side 138 (e.g., attachment mechanisms 132, dilution hole bosses 144, etc.). For example, as shown in FIG. 1D, embedded cooling pins 140a are shown. The embedded cooling pins 140a can cause issues with high casting scrap due to excessive flash and other producibility issues. This is true of both the embedded cooling pins 140a and also pins that are too close to the extending features (e.g., attachment mechanisms 132, dilution hole bosses 144, etc.).

Figure 2:
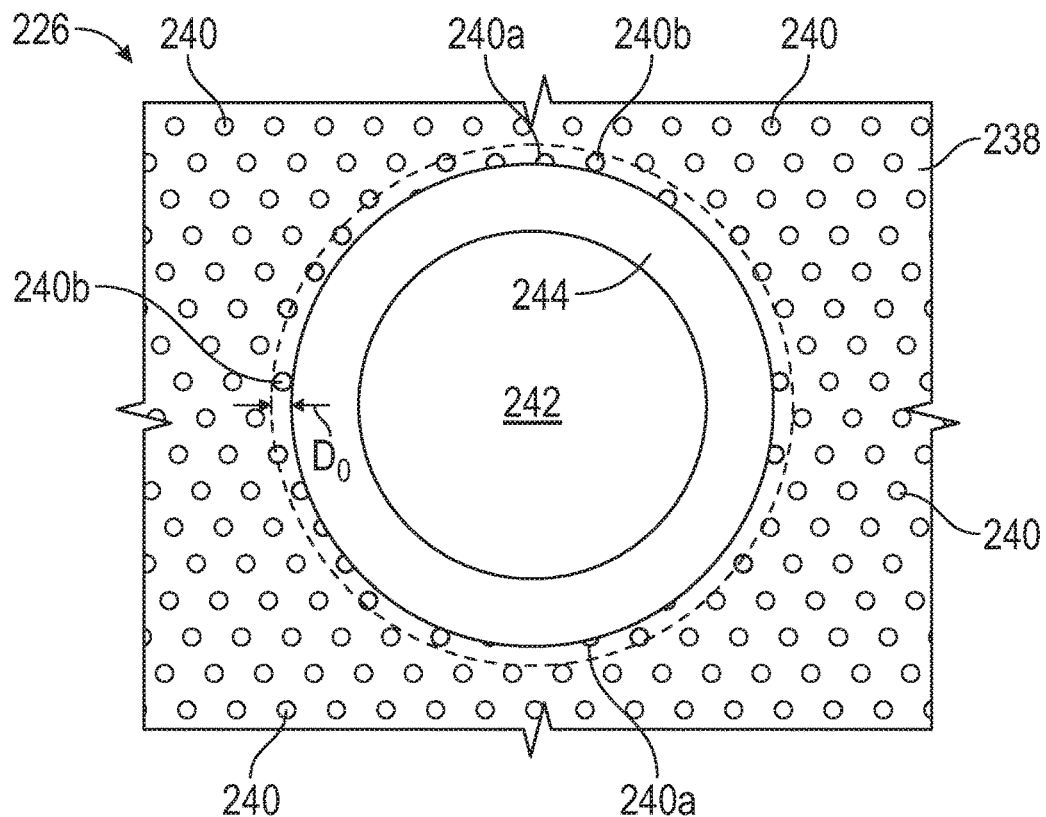
FIG. 2 is a plan view illustration of a portion of a combustor panel having a plurality of cooling pins extending from a cold side thereof located around a structural protrusion of the combustor panel.

Turning to FIG. 2, a plan view illustration of a portion of a combustor panel 226 having a plurality of cooling pins 240 extending from a cold side 238 thereof is shown. The combustor panel 226, as shown, includes a dilution hole 242 that passes through a body of the combustor panel 226 and is defined (and supported) by a structural protrusion 244 (e.g., dilution hole boss). As shown, the cooling pins 240 form a uniform distribution or pattern on the combustor panel 226. When the structural protrusion 244 is formed in the combustor panel 226, certain of the cooling pins 240 may become embedded within the material of the structural protrusion 244 or may be within a minimum distance that is sufficient to cause flashing during the manufacturing process. For example, as shown in FIG. 2, a number of embedded cooling pins 240a are embedded into and part of the structural protrusion 244. Further, as shown, a number of flash-inducing cooling pins 240b are formed within a minimum separation distance $D_0$ of the structural protrusion 244. The minimum separation distance $D_0$ is a distance measured between the closest points on a surface of the structural protrusion 244 and the cooling pin 240. When a cooling pin 240 is located within the minimum separation distance $D_0$ the cooling pin 240 is a flash-inducing cooling pin 240b. That is, the flash-inducing cooling pins 240b are within sufficient proximity to the structural protrusion 244 such that flashing will occur between the material of the flash-inducing cooling pin 240b and the effusion hole boss 244. Although shown and described in FIG. 2 as cooling pins 240 in proximity to a structural protrusion 244, those of skill in the art will appreciate that similar flashing can occur with respect to any extending feature of the combustor panel, including, but not limited to, side rails, attachment mechanisms, grommets, etc.

Figure 3A:
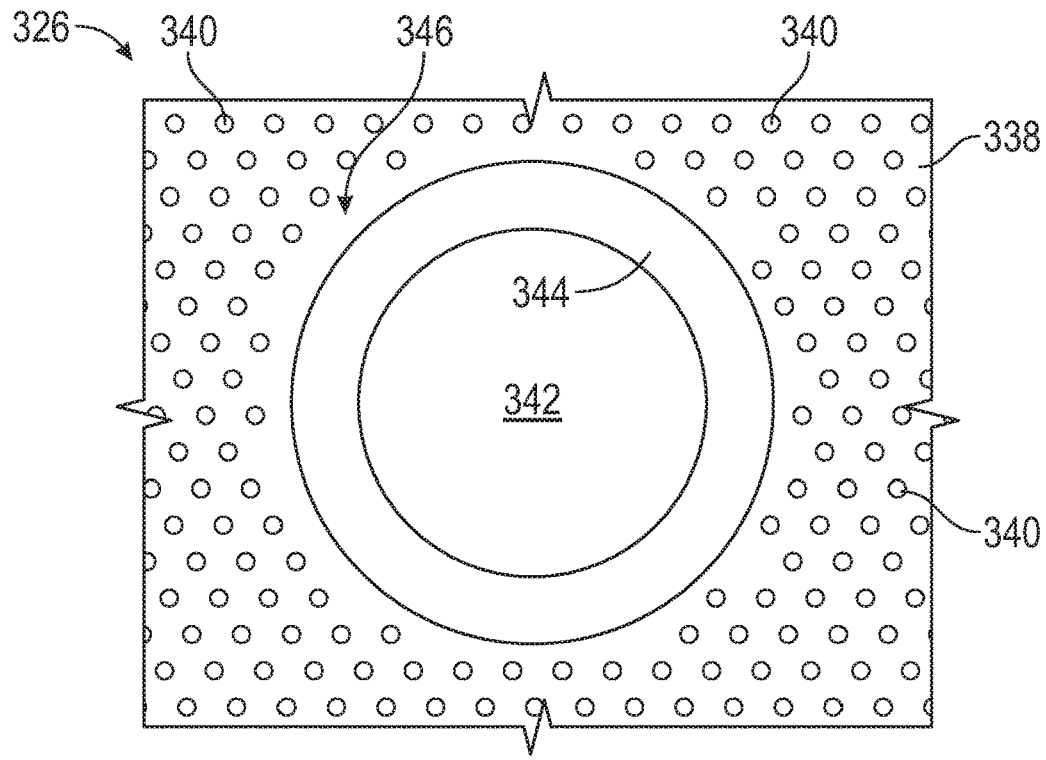
FIG. 3A is a plan view illustration of a portion of a combustor panel having a plurality of cooling pins removed from locations in proximity to a structural protrusion of the combustor panel.

Turning to FIG. 3A, to prevent the flashing, the embedded pins and the flash-inducing cooling pins can be removed from a mold of the combustor panel 326, and thus be eliminated entirely from the manufacturing process. As shown in FIG. 3A, the combustor panel 326 includes a plurality of cooling pins 340 in an array of distributed pattern around a dilution hole 342 defined by a structural protrusion 344. By removing the embedded and flash-inducing pins (e.g., pins 240a, 240b shown in FIG. 2) one or more voids 346 are formed around the structural protrusion 344. The voids 346 can impact a cooling flow that flows along the cold side of the combustor panel 326 negatively. Such impact on the cooling flow can reduce the cooling effectiveness achieved by the array of cooling pins 340. That is, by entirely removing the pins in proximity to the structural protrusions, voids 346 will be formed in areas around the structural protrusions (e.g., dilution hole bosses, attachment mechanisms, side rails, etc.) and doesn't cool other areas in the panel with a denser population of pins and can create a non-uniform distribution of cooling flow downstream.

Figure 3B:
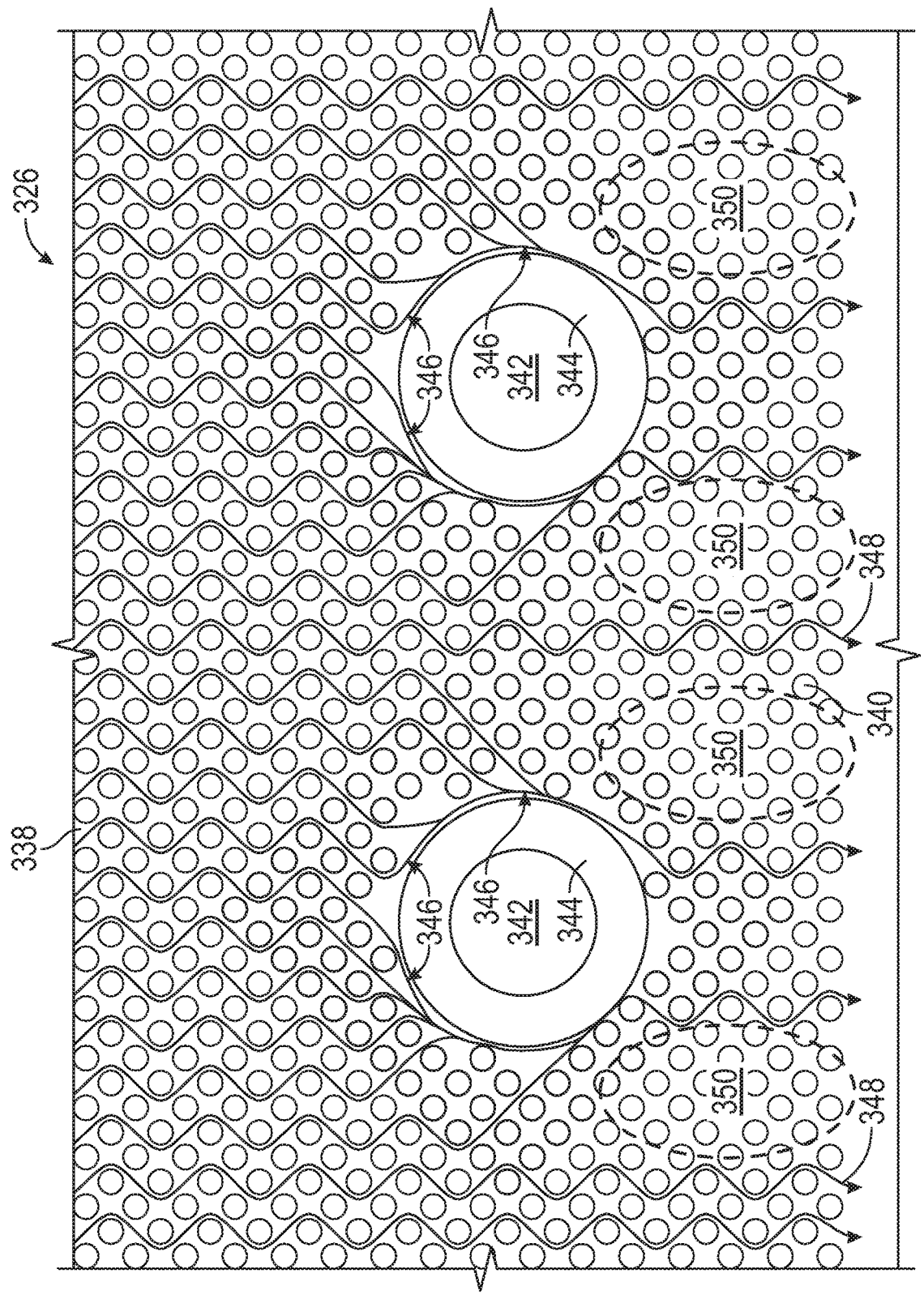
FIG. 3B is a schematic illustration of the combustor panel of FIG. 3A illustrating a flow path of a cooling flow along a cold side of the combustor panel.

FIG. 3B illustrates a cooling flow 348 that flows along a cold side 338 of the combustor panel 326. As shown, the voids 346 provide for a path-of-least-resistance for the cooling flow 348, such that the cooling flow 348 will tend to flow into and through the voids 346. As a result, the cooling flow 348 will aggregate and not evenly flow through the array of cooling pins 340. This can cause hot zones 350 to be formed during a cooling operation. The hot zones 350 may not receive sufficient cooling flow 348 and thus may heat to excessive temperatures during a combustion operation, and accordingly, the operational life of the combustor panel 326 may decrease.

Figure 4:
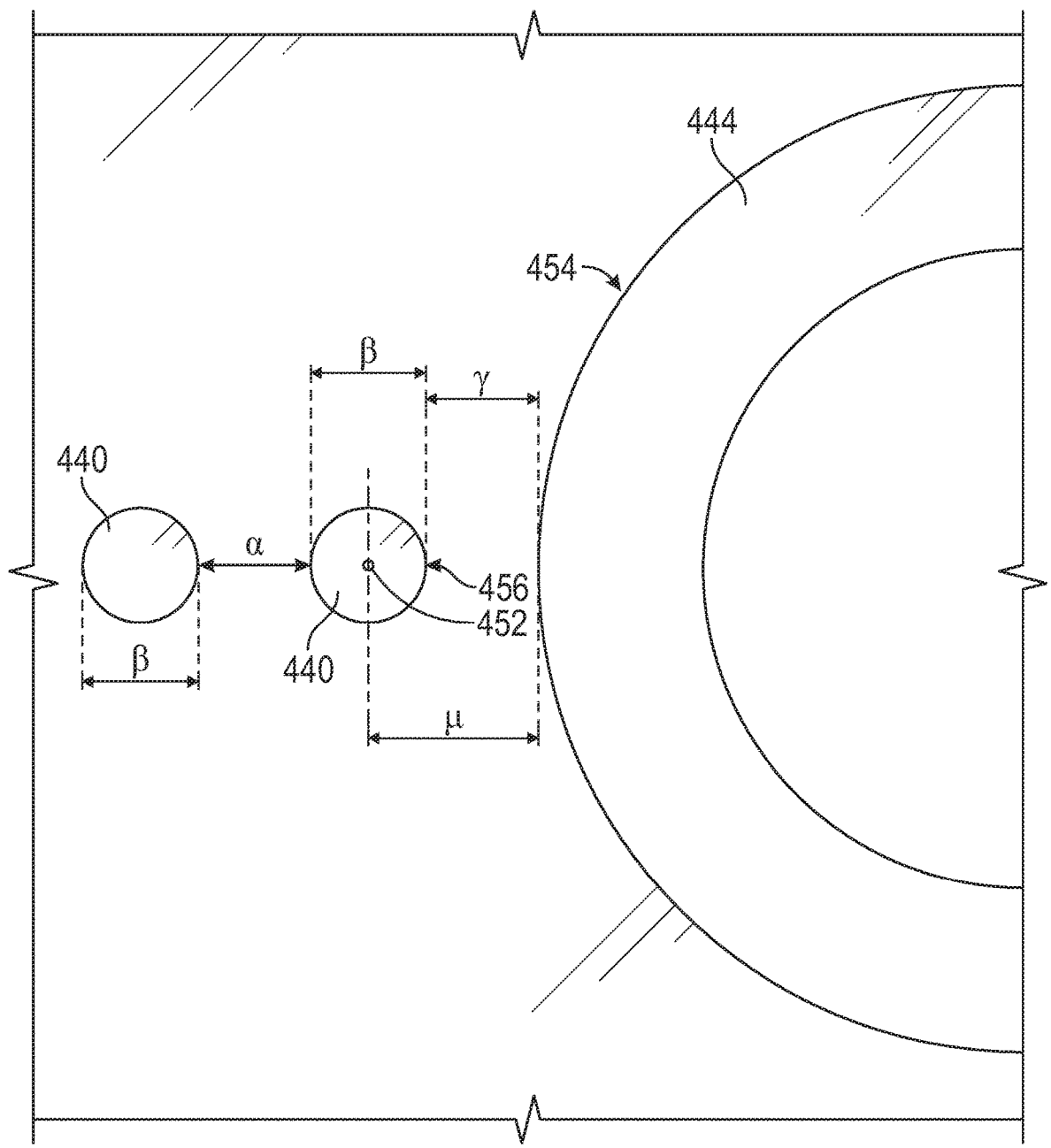
FIG. 4 is a schematic illustration of a pin arrangement in proximity to a structural protrusion of a combustor panel.

Turning now to FIG. 4, a detailed illustration of cooling pins 440 in proximity to a structural protrusion 444 is shown. The illustration of FIG. 4 is merely for illustrative and explanatory purposes and, thus, only shows two cooling pins 440 and a partial portion of the structural protrusion 444. The two cooling pins 440 are separated by a pin array separation distance $\alpha$. The pin array separation distance $\alpha$ is a set value or distance that is set to achieve a desired cooling flow along a cold side of a combustor panel while minimizing weight of the combustor panel. All pins of the pin array or pin distribution pattern are separated from the closest other pins by the pin array separation distance $\alpha$. As shown, the pin array separation distance $\alpha$ is a distance between the closest points or surfaces of adjacent cooling pins 440. Each cooling pin 440 has a pin diameter $\beta$, which is selected based on similar considerations as pin array separation distance $\alpha$.

In a manufacturing process of the combustor panel, flashing may occur when a cooling pin 440 is within a flashing distance $\mu$. The flashing distance $\mu$ is a distance between a center point 452 of a cooling pin 440 and the closest point on a boss exterior surface 454 of the structural protrusion 444. Stated another way a protrusion separation distance $\gamma$ is defined as the minimum distance between the boss exterior surface 454 and a pin exterior surface 456. As such, the flashing distance $\mu$ is equal to the protrusion separation distance $\gamma$ plus one half of the pin diameter $\beta$ (i.e., $\mu=\gamma+\beta/2$). In some non-limiting embodiments, the pin array separation distance $\alpha$ and the protrusion separation distance $\gamma$ may be equal. As an illustrative example, in some arrangements, the pin array may be defined with a pin array separation distance $\alpha$ of approximately 10-15 mil (0.010 to 0.015 inches), and in some specific embodiments, the pin array separation distance $\alpha$ may be about 13 mil (0.013 inches). The pin array separation distance $\alpha$ may be a tolerance (e.g., minimum distance) based on a casting or other manufacturing limitation. As will be appreciated by those of skill in the art, the protrusion separation distance $\gamma$ is similar to the minimum separation distance $D_0$ shown in FIG. 2. When a cooling pin 440 is located at a distance less than the protrusion separation distance $\gamma$ (or less than the flashing distance $\mu$), flashing may occur, which is to be avoided.

In accordance with embodiments of the present disclosure, combustor panels are modified to address the drawbacks of having flashing (with cooling pins within the minimum separation distance $D_0$) and/or associated with voids formed by the elimination of such cooling pins (e.g., voids 346 shown in FIGS. 3A-3B). To achieve this, a mold used to form a combustor panel is modified at the location around and/or near the structural protrusions (e.g., dilution hole bosses, attachment mechanisms, side rails, etc.). The determination of which cooling pins are impacted by the modifications to the combustor panels (e.g., within the minimum separation distance $D_0$ shown in FIG. 2) is based on the following equation:

$$\mu \leq \frac{\beta}{2} + \gamma.$$

In order to optimize both castability and airflow cooling through the pin array, the boss (or other extending features) can be radially extended in an intermittent fashion mimicking the pin array configuration in the problematic casting zones. These pin array extensions, in accordance with embodiments of the present disclosure, can be located around the structural protrusion where a cooling pin following the pin array pattern would occur within the minimum separation distance. Such pin array extensions can prevent leakage into the circumferential area around the boss (e.g., voids 346 shown in FIGS. 3A-3B). Further, such pin array extensions can force air into the pin array downstream of the boss to enhance cooling in the previously existing hot zones (e.g., hot zones 350 shown in FIG. 3B). Furthermore, arrangements of bosses and other extending features of combustor panels in accordance with embodiments of the present disclosure can improve castability and/or manufacturing of such combustor panels.

Figure 5A:
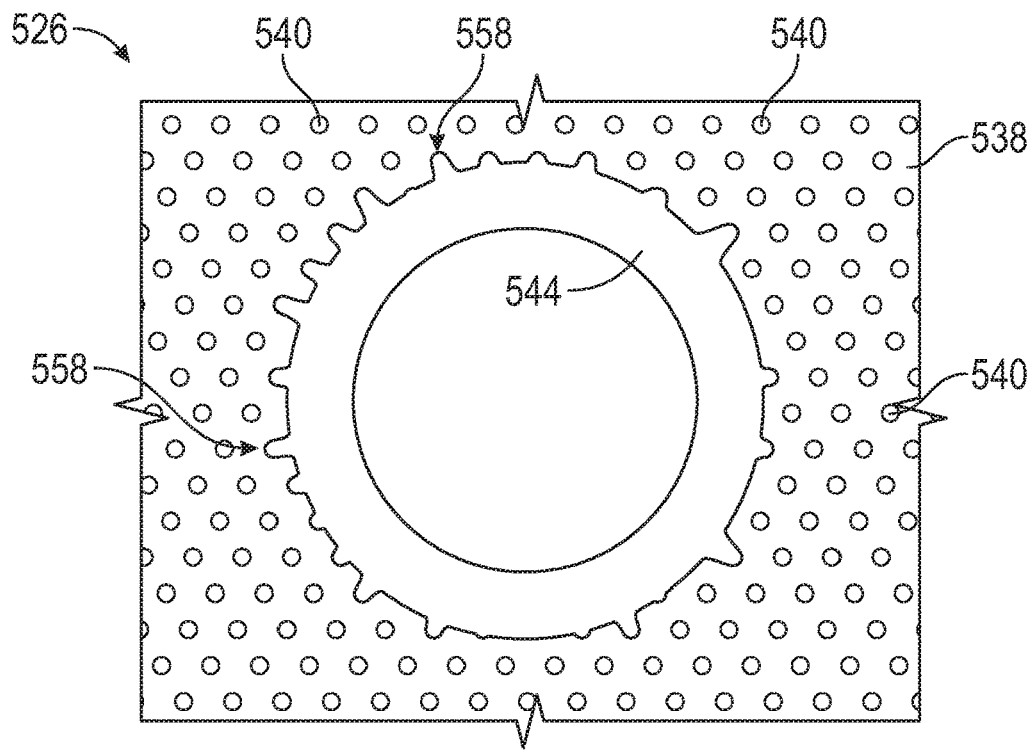
FIG. 5A is a schematic illustration of a combustor panel having a pin array and structural protrusion having integral pin array extensions formed in accordance with an embodiment of the present disclosure.
Figure 5B:
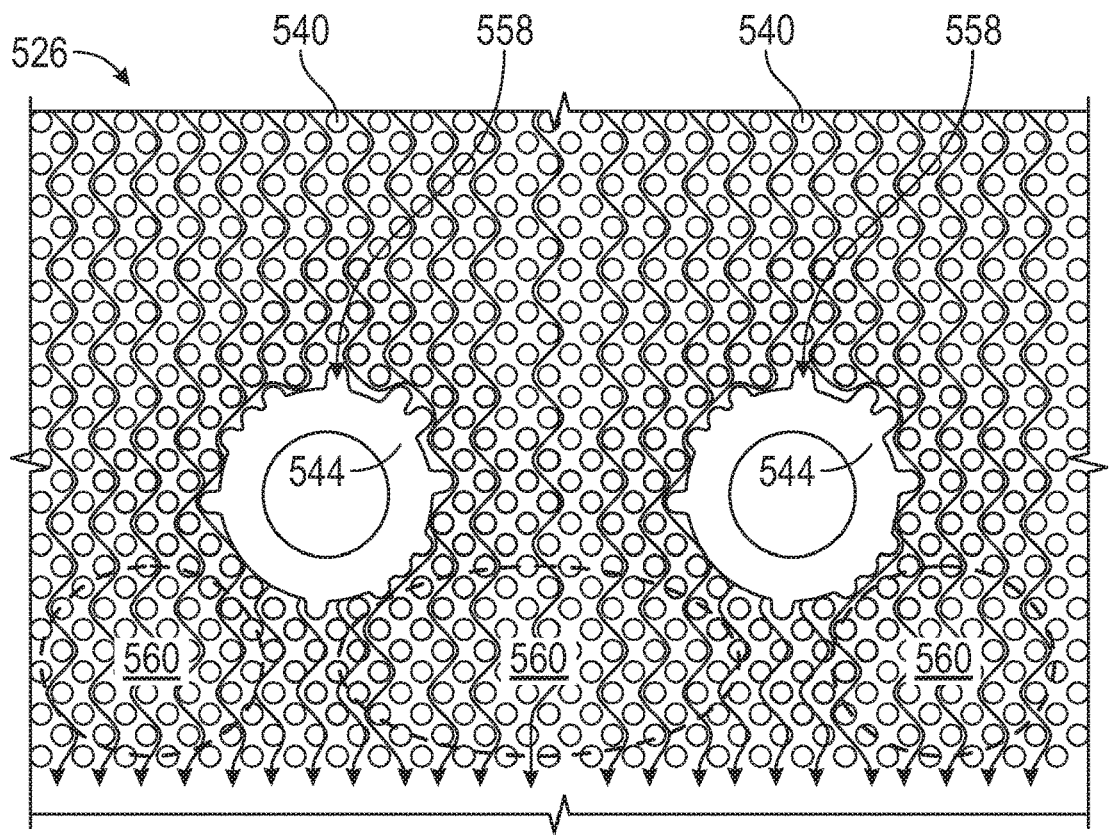
FIG. 5B is a schematic illustration of a cooling flow along a cold side of the combustor panel shown in FIG. 5A.

Turning now to FIGS. 5A-5B, schematic illustrations of a combustor panel 526 formed in accordance with an embodiment of the present disclosure are shown. FIG. 5A is a detailed illustration of a pin array arrangement in proximity to a structural protrusion 544 of the combustor panel 526 and FIG. 5B is a schematic illustration of airflow along a cold side of the combustor panel 526 having a pin array and structural protrusion 544 in accordance with an embodiment of the present disclosure. As shown, the combustor panel 526 includes a plurality of cooling pins 540 formed in a pin array, with the cooling pins 540 each being separated from adjacent cooling pins 540 by a pin array separation distance, as shown and described above.

As shown in FIG. 5A, the structural protrusion 544 is formed with a plurality of pin array extensions 558. The pin array extensions 558 are radial extensions of the material of the structural protrusion 544 along a cold side 538 of the combustor panel 526. The location of the pin array extensions 558 are designed to substantially match or fit the pin array of the cooling pins 540. That is, at locations where a cooling pin 540 would have been within the minimum separation distance $$\left(\text{e.g., } \mu \leq \frac{\beta}{2} + \gamma\right),$$

the cooling pin is omitted and a pin array extension 558 is formed extending from the structural protrusion 544. The pin array extensions 558 are shaped and sized such that no portion of the pin array extension 558 is closer to an adjacent cooling pin 540 than the pin array separation distance (e.g., pin array separation distance $\alpha$ shown in FIG. 4). Further, the pin array extensions 558 can include curved or contoured shapes and/or geometries to aid in airflow that flows around the structural protrusion 544 and enhances producibility.

As shown in FIG. 5B, the structural protrusion 544 having pin array extensions 558 provides an improved cooling flow along the combustor panel 526. As shown, a more even flow distribution 560 is achieved downstream from the structural protrusions 544. That is, the pin array extensions 558 of the structural protrusions 544 fill in the voids that would have been present if the cooling pins within the minimum distance of the structural protrusion had been removed. Further, because the pin array extensions 558 are part of the structural protrusion 544 (e.g., integrally formed therewith) no flashing will occur during a manufacturing process.

The combustor panel 526, in some embodiments, is formed from a mold with liquid metal poured into the mold. Typically, this molding process can cause the flashing described above. However, because the molds can be formed to have the shape/geometry pin array extensions around the molds for the structural protrusions, no flashing may occur and improved casting processes can be achieved. Accordingly, embodiments of the present disclosure are directed to molds for forming combustor panels as described herein. As will be appreciated by those of skill in the art, the molds are "negatives" of the combustor panels illustrated herein. Thus, for example referring to FIG. 5A, a mold used to form the combustor panel 526 would include cavities for each cooling pin 540 and a cavity for the structural protrusion 544 having the pin array extensions 558.

The use of the terms "a," "an," "the," and similar references in the context of description (especially in the context of the following claims) are to be construed to cover both the singular and the plural, unless otherwise indicated herein or specifically contradicted by context. The modifier "about" and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A combustor panel comprising:
   a panel body in a gas turbine engine, the panel body having a first side and a second side;
   a plurality of cooling pins extending from the first side, the plurality of cooling pins arranged in a pin array, wherein each cooling pin extends a first height from the first side of the panel body, has a pin diameter, and is separated from adjacent cooling pins of the pin array by a pin array separation distance;
   at least one structural protrusion extending from the first side of the panel body, wherein the at least one structural protrusion is at least one of a dilution hole boss and an attachment mechanism;
   wherein no pins of the pin array are located within a flashing distance that is equal to a protrusion separation distance plus one half of the pin diameter, wherein the protrusion separation distance is a predetermined minimum distance between an exterior surface of the at least one structural protrusion and an exterior surface of a cooling pin, the predetermined minimum distance may be equal to the pin array separation distance, and wherein a location of the cooling pin is measured from a center point of the cooling pin to a closest point on the exterior surface of the at least one structural protrusion; and
   at least one pin array extension integrally formed with the at least one structural protrusion, the at least one pin array extension extending along the first side of the panel body from the exterior surface of the at least one structural protrusion to a position of a cooling pin of the pin array that would be within the flashing distance, the at least one pin array extension replacing the cooling pin of the pin array that would be within the flashing distance.

2. The combustor panel of claim 1, wherein the at least one structural protrusion extends from the first side a distance greater than the first height.

3. The combustor panel of claim 1, wherein the at least one structural protrusion includes a plurality of pin array extensions arranged around the at least one structural protrusion.

4. The combustor panel of claim 1, wherein the pin array separation distance is between 0.010 inches and 0.015 inches.

5. The combustor panel of claim 4, wherein the pin array separation distance is 0.013 inches.

6. A combustor comprising:
   a combustor shell in a gas turbine engine; and
   at least one combustor panel mounted to the combustor shell, the at least one combustor panel comprising:
   a panel body having a first side and a second side;
   a plurality of cooling pins extending from the first side, the plurality of cooling pins arranged in a pin array, wherein each cooling pin extends a first height from the first side of the panel body, has a pin diameter, and is separated from adjacent cooling pins of the pin array by a pin array separation distance;
   at least one structural protrusion extending from the first side of the panel body, wherein the at least one structural protrusion is at least one of a dilution hole boss arranged to allow dilution air to pass through the combustor shell and the combustor panel into a combustion chamber, and an attachment mechanism, wherein the attachment mechanism fixedly attaches the at least one combustor panel to the combustor shell;
   wherein no cooling pins of the pin array are located within a flashing distance that is equal to a protrusion separation distance plus one half of the pin diameter, wherein the protrusion separation distance is a predetermined minimum distance between an exterior surface of the at least one structural protrusion and an exterior surface of a cooling pin, the predetermined minimum distance may be equal to the pin array separation distance, and wherein a location of the cooling pin is measured from a center point of the cooling pin to a closest point on the exterior surface of the at least one structural protrusion; and at least one pin array extension integrally formed with the at least one structural protrusion, the at least one pin array extension extending along the first side of the panel body from the exterior surface of the at least one structural protrusion to a position of a cooling pin of the pin array that would be within the flashing distance, the at least one pin array extension replacing the cooling pin of the pin array that would be within the flashing distance.

7. The combustor of claim 6, wherein the at least one structural protrusion extends from the first side a distance greater than the first height.

8. The combustor of claim 6, wherein the at least one structural protrusion includes a plurality of pin array extensions arranged around the at least one structural protrusion.

9. The combustor of claim 6, wherein the pin array separation distance is between 0.010 inches and 0.015 inches.

10. The combustor of claim 9, wherein the pin array separation distance is 0.013 inches.

11. The combustor of claim 6, wherein the at least one combustor panel is positioned with the second side exposed to the combustion chamber and a cooling flow passes between the combustor shell and the at least one combustor panel along the first side, wherein the pin array provides thermal transfer between the at least one combustor panel and the cooling flow.

12. The combustor of claim 11, wherein the at least one pin array extension alters the cooling flow around the at least one structural protrusion to prevent hot zones on the at least one combustor panel at locations downstream of the at least one structural protrusion in a direction of flow of the cooling flow.

13. The combustor of claim 6, wherein the at least one combustor panel is a float wall combustor panel.

* * * * *